(12) United States Patent
Schwager et al.

(10) Patent No.: US 9,379,923 B2
(45) Date of Patent: Jun. 28, 2016

(54) METHOD FOR OPERATING A PLC SYSTEM, PLC MODEM DEVICE AND PLC SYSTEM

(75) Inventors: Andreas Schwager, Waiblingen (DE); Altfried Dilly, Stuttgart (DE); Ben Eitel, Gaertringen (DE)

(73) Assignee: Sony Corporation, Tokyo (JP)

( * ) Notice: Subject to any disclaimer, the term of this patent is extended or adjusted under 35 U.S.C. 154(b) by 112 days.

(21) Appl. No.: 13/701,172

(22) PCT Filed: May 18, 2011

(86) PCT No.: PCT/EP2011/002478
§ 371 (c)(1),
(2), (4) Date: Feb. 25, 2013

(87) PCT Pub. No.: WO2011/154087
PCT Pub. Date: Dec. 15, 2011

(65) Prior Publication Data
US 2013/0142231 A1 Jun. 6, 2013

(30) Foreign Application Priority Data
Jun. 9, 2010 (EP) .................................... 10005950

(51) Int. Cl.
*H04B 1/38* (2015.01)
*H04L 25/08* (2006.01)
*H04B 3/54* (2006.01)

(52) U.S. Cl.
CPC ............... *H04L 25/085* (2013.01); *H04B 3/54* (2013.01); *H04B 2203/5491* (2013.01); *H04B 2203/5495* (2013.01)

(58) Field of Classification Search
CPC .... H04M 11/06; H04M 11/062; H04L 25/0272; H04L 25/0292; H04L 25/0266; H04B 2203/5483
USPC .................. 375/257, 296, 346, 222, 285, 259
See application file for complete search history.

(56) References Cited

U.S. PATENT DOCUMENTS

| | | |
|---|---|---|
| 2004/0109499 A1 | 6/2004 | Cern |
| 2006/0077046 A1 | 4/2006 | Endo |

(Continued)

FOREIGN PATENT DOCUMENTS

| | | |
|---|---|---|
| CN | 101027851 A | 8/2007 |
| CN | 101542863 A | 9/2009 |

(Continued)

OTHER PUBLICATIONS

English translation of the Combined Chinese Office Action and Search Report issued Feb. 24, 2014, in Chinese Patent Application No. 201180027472.0.

(Continued)

*Primary Examiner* — Dac Ha
*Assistant Examiner* — Janice Tieu
(74) *Attorney, Agent, or Firm* — Oblon, McClelland, Maier & Neustadt, L.L.P (57) ABSTRACT

A method for operating a PLC system including at least one PLC modem device, in which interferences on transmission signals of the PLC system and/or on a transmission spectrum of the PLC system are detected, the interferences are caused by influences of an impedance modulating device connected to a mains used by the PLC system for communication, and, in a case such interferences are detected, frequencies on which the impedance modulating device causes interferences are selected to be notched from power line communication and/or time periods when the impedance modulating device is in a switching mode are selected to be avoided for transmitting PLC signals. A PLC modem device and a PLC system can implement the method.

21 Claims, 7 Drawing Sheets

(56) References Cited

U.S. PATENT DOCUMENTS

| | | | |
|---|---|---|---|
| 2007/0064788 A1* | 3/2007 | Yonge, III | 375/239 |
| 2008/0055067 A1 | 3/2008 | Curt et al. | |
| 2008/0310457 A1* | 12/2008 | Yamashita et al. | 370/491 |
| 2009/0029665 A1* | 1/2009 | Pervez et al. | 455/234.1 |
| 2009/0060060 A1 | 3/2009 | Stadelmeier et al. | |
| 2010/0061433 A1* | 3/2010 | Stadelmeier | H04B 3/32 375/222 |
| 2012/0093151 A1* | 4/2012 | McFarland et al. | 370/389 |

FOREIGN PATENT DOCUMENTS

| | | |
|---|---|---|
| EP | 1 786 115 | 5/2007 |
| EP | 2 019 496 | 1/2009 |
| KR | 10-2009-0091607 A | 8/2009 |
| WO | 2008 028144 | 3/2008 |
| WO | WO 2011/006585 A2 | 1/2011 |

OTHER PUBLICATIONS

Lauder, D., "Powerline Ethernet Adaptors—how well does 'notching' of amateur bands work in practice," EMC, Radcom, pp. 72-73, (Feb. 2010).

International Search Report Issued Nov. 16, 2011 in PCT/EP11/02478 Filed May 18, 2011.

European Office Action issued Apr. 18, 2016, in European Patent Application No. 11 720 397.6.

"PowerLine Telecommunications (PLT); coexistence between PLT Modems and Short Wave Radio broadcasting services; ETSI TS 102 578;" ETSI Standard, European Telecommunications Standards Institute (ETSI), Sophia Antipolis Cedex, France, No. V1.2.1, Aug. 2008.

* cited by examiner

METHOD FOR OPERATING A PLC SYSTEM, PLC MODEM DEVICE AND PLC SYSTEM

The invention relates to a method for operating a power line communication (PLC) system, wherein an impedance modulating device connected to a mains used by the PLC system for communication causes interferences on transmission signals of the PLC system and/or on a transmission spectrum of the PLC system. The invention further relates to a corresponding PLC modem device and a corresponding PLC system.

BACKGROUND

Power line communication (PLC), also called mains communication, power line transmission (PLT), broadband power line (BPL), power band or power line networking (PLN), is a term describing a method for using power distribution wires for simultaneous distribution of data. A carrier can communicate voice and data by superimposing an analogue signal over the standard 50 Hz or 60 Hz alternating current (AC). For indoor applications PLC equipment can use household electrical power wiring as a transmission medium.

In order to avoid interferences to amateur radio or other radio services or other external services, frequencies used by these services are notched, i.e. not used for power line communication.

However, power line communication between devices within a PLC system may be interfered by impedance modulating devices outside the PLC system, but connected to the same electrical power wiring, e.g. non linear devices and small switching power supplies, as for instance mobile phone chargers, power supplies for notebooks or energy saving light bulbs. The impedance modulating devices may lead to frequency intermodulations causing inter-carrier-interferences resulting in a reduced transmission quality or lower throughput rates with respect to the power line communication itself and in affecting the transmission spectrum of the PLC system. In particular, transmission signal level may be increased in frequency bands not used for power line communication within the PLC system. Thus, notching as described above is performed less effective than without interferences from impedance modulating devices. This effect is described, for instance, by David Lauder: "Powerline Ethernet Adaptors—how well does 'notching' of amateur bands work in practice?", EMC, Radcom, February 2010.

It is an object of the invention to provide a method for operating a PLC system, which effectively prevents interferences to power line communication within the PLC system itself and to external services caused by impedance modulating devices connected to a mains used by the PLC system for communication. It is furthermore an object of the invention to provide a PLC modem device and a PLC system for performing the method.

The above objects are achieved by the claimed matter according to the independent claims.

Further embodiments are defined in the dependent claims.

Further details of the invention will become apparent from a consideration of the drawings and ensuing description.

DETAILED DESCRIPTION

In the following, embodiments of the invention are described. It is important to note that all described embodiments in the following and their properties and technical features may be combined in any way, i.e. there is no limitation that certain described embodiments, properties and technical features may not be combined with others, unless specifically noted otherwise. Further, it should be noted that same reference signs throughout the Figures denote same or similar elements.

It is to be understood that other embodiments may be utilized and structural or logical changes may be made without departing from the scope of the invention. The following detailed description, therefore, is not to be taken in a limiting sense, and the scope of the present invention is defined by the appended claims.

Figure 1:
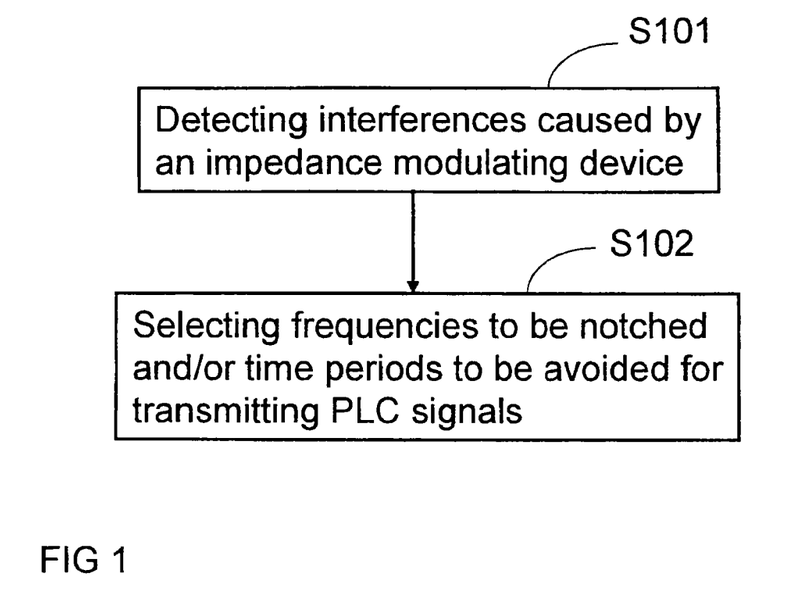
FIG. 1 shows steps of an embodiment of the method according to the invention.

FIG. 1 is a schematic flowchart of a method for operating a PLC system comprising a plurality of PLC modem devices.

In a step S101, interferences on transmission signals of the PLC system and on a transmission spectrum of the PLC system are detected. The detected interferences are caused by influences of an impedance modulating device connected to a mains used by the PLC system for communication. In the following description, the term "impedance modulating device" describes a device with a time variant impedance, for instance a device with a line cycle periodic time variant impedance. Such impedance modulating devices may be, for instance, small sized power supplies, which do not embed a heavy power transformer. Such power supplies are commonly used, by example, in mobile phone chargers, power supplies for notebooks or energy saving light bulbs. They include bridge rectifier diodes and a blocking capacitor delivering the DC power directly from the AC mains. A switching element generates the alternating current for the voltage transformation.

Figure 2A:
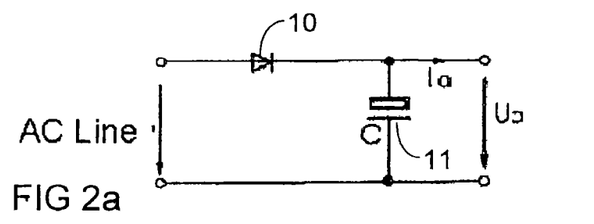
FIGS. 2a, 2b show circuit diagrams of rectifier components of impedance modulating devices.
Figure 2B:
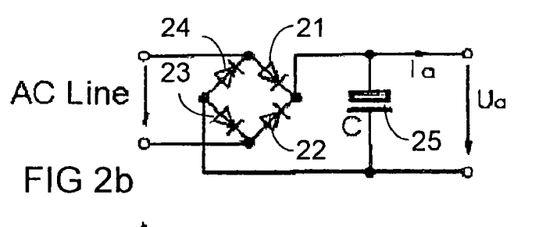
Figure 3A:
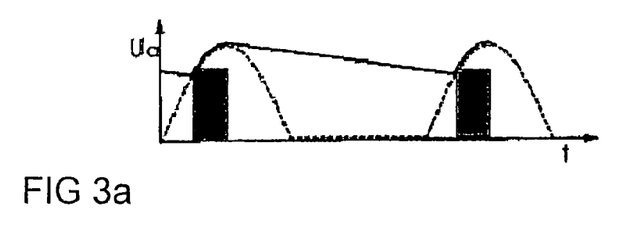
FIGS. 3a, 3b show schematic diagrams of a voltage-time relation, when the impedance modulating devices of FIGS. 2a or 2b, respectively, are present.
Figure 3B:
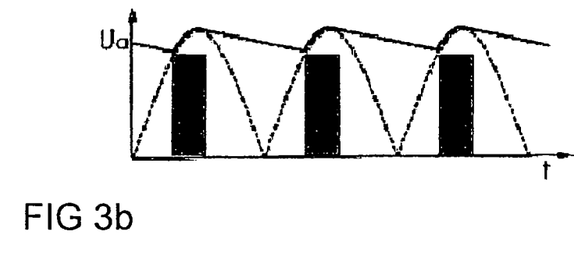

FIGS. 2a and 2b show circuit diagrams of rectifier components of impedance modulating devices as described above. In FIG. 2a, the rectifier component includes one rectifier diode 10 and a blocking capacitor 11, whereas the rectifier component illustrated in FIG. 2b includes four rectifier diodes 21 to 24 and a blocking capacitor 25. FIGS. 3a and 3b show the corresponding time-dependence of the voltage Ua on a power line, if an impedance modulating device comprising the rectifier component of FIG. 2a or 2b, respectively is present.

The rectifier diodes 10 or 21 to 24, respectively, conduct during charging periods of the capacitor 11 or 25, respectively. Depending on the impedance of the circuit behind the bridge rectifier diodes, the high frequency signals of the power line communication might be shortcut. If the rectifier diodes 10 or 21 to 24, respectively are blocking, the impedance modulating device has a high input impedance. Therefore the impedance of the mains changes twice or four times every line cycle period of the alternating current (AC) on the mains, for instance twice or four times every 20 ms in a 50 Hz installation, between two quasi-static values.

An impedance modulating device or a line cycle periodic time variant impedance as described above may interfere with power line communication in different ways. Power line communication itself may be influenced by the different values of the impedance of the mains. Different communication conditions, like communication channels, frequency bands, transmission gain or others, may be chosen for the quasi-static time intervals. However, transmission of power line communication signals during time periods where the impedance modulating device switches may result in a non-correctable loss of data. Furthermore, the impedance modulating device may influence the transmission spectrum of the PLC system such that the signal energy at frequencies not used for PLC transmission may increase significantly due to inter-modulations of the transmitted signals.

However, not all frequencies used for power line communication are influenced identically by the impedance modulating device. There are PLC transmission frequencies which are influenced at a low level, whereas other PLC transmission frequencies are heavily influenced causing severe inter-carrier interferences. Furthermore, frequency intermodulations caused by the impedance modulating device are generated at specific timings, not permanently, and are severe particularly in time periods when the impedance switches.

Therefore, in step S102 of the method for operating a PLC system according to the invention, in the case that such interferences are detected, frequencies on which the impedance modulating device causes interferences are selected to be notched from power line communication within the PLC system and/or time periods when the impedance modulating device is in a switching mode are selected to be avoided for transmitting PLC signals. That is, influenced transmission frequencies may be notched from power line communication at all or only at time periods when the impedance is switching. Furthermore, all transmission of PLC signals may be avoided during the selected time periods.

In order to detect interferences caused by intermodulations, according to an embodiment of the method, a signal transmitted by a transmitting PLC modem device of the PLC system and received by a receiving device is monitored at frequencies not being included in a frequency range used for power line communication, while sweeping the transmission frequency over the frequency range used for power line communication. The transmitting PLC modem transmits a signal at a frequency comprised by the transmission band of the PLC system. That is, the transmitting PLC modem device does not transmit a signal at a frequency which is used by amateur radio or other radio services or by other PLC systems and which therefore have to be kept free of PLC transmission within the PLC system. The receiving device measures the transmitted signal at frequencies not used for PLC within the PLC system that is at exactly that frequencies which have to be kept free. By way of example, the transmitting PLC modem device transmits on a frequency of 23 MHz, whereas the receiving device measures the signal at frequencies of 21 MHz and 25 MHz, which are frequencies usually kept free for radio services. An interference is determined as present for a specific transmission frequency, if the measured signal for transmission at this specific transmission frequency is larger than the noise without transmission of signals over the PLC system.

The receiving device may be any PLC modem device of the PLC system, even the transmitting device itself, or any other device capable of monitoring the signal, for example a network or spectrum analyzer. The receiving device may receive the signal wireless, for instance via an antenna, or over a wire connected to the mains or to the transmitting PLC modem device.

Figure 4:
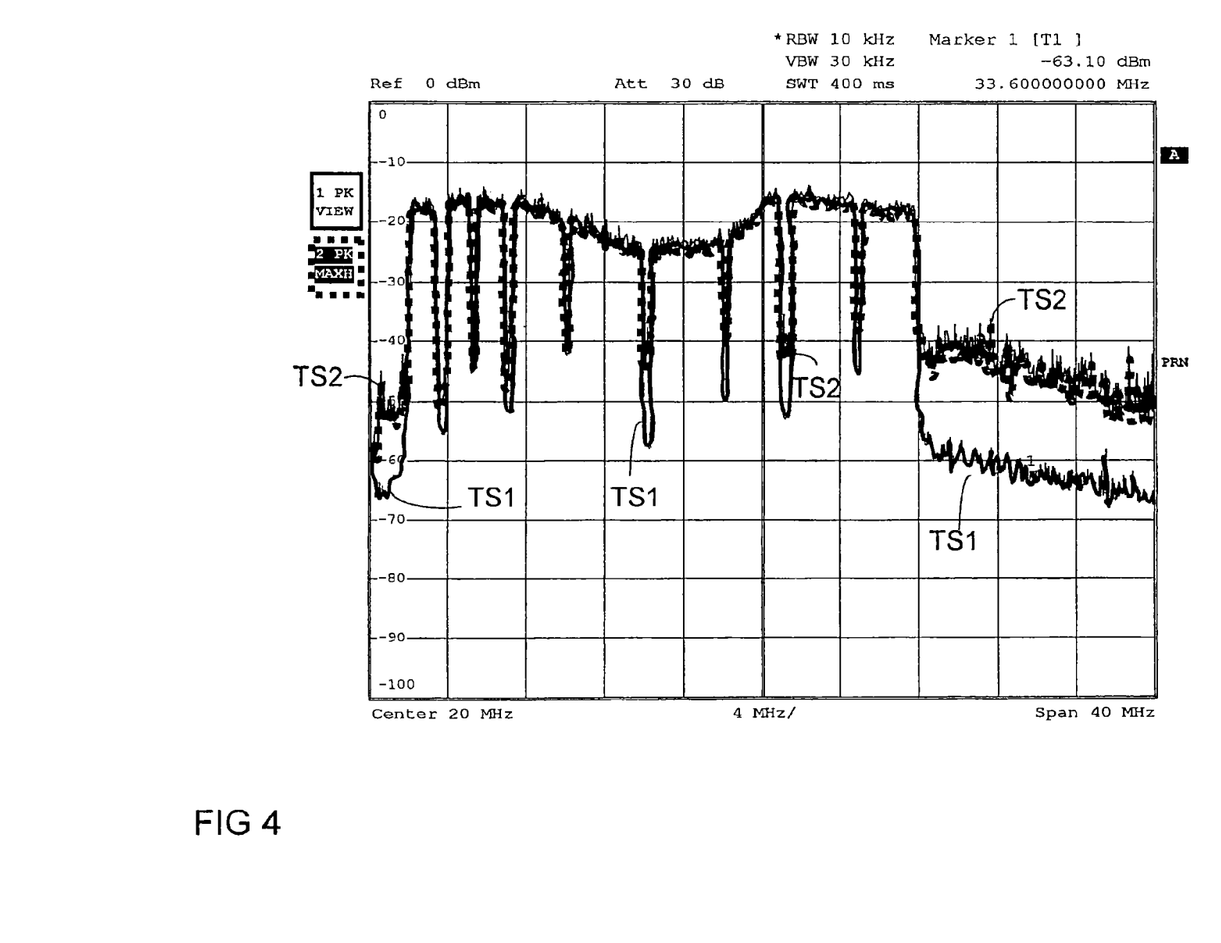
FIG. 4 shows transmission spectra of a PLC system when an impedance modulating device is absent or present, respectively.

The effect of an impedance modulating device on a transmission spectrum of a PLC system is illustrated in FIG. 4. Two transmission spectra are shown, wherein TS1 (non-dotted) is the transmission spectrum of the PLC system when no impedance modulating device is connected to the mains, and wherein TS2 (dotted) is the transmission spectrum of the same PLC system when an impedance modulating device is present. The x-axis represents the frequency changing from 0 MHz to 40 MHz and is scaled in 4 MHz per division. The y-axis represents the received signal level using a scale of 10 dB per division. As can be seen, the signal level within the frequency bands used for PLC transmission is between −15 dB and −25 dB and is only little influenced by the impedance modulating device. However, the signal level out of transmission bands, e.g. at frequencies smaller than 2 MHz or larger than 28 MHz and within the notches, is significantly increased. Especially the increase within the notches at 3.5, 7, 14, 18, 21 and 25 MHz used by radio services is severe and may reduce the level of protection to these radio services.

Using the above identified embodiment of the inventive method, transmission frequencies causing such an increase in the signal level within the notches or out of the transmission bands may be selected and may be avoided in further power line communication within the PLC system.

According to another embodiment, interference might be detected by observing the inter-carrier-interference (ICI) of a PLC signal using carrier frequencies assigned to the transmission band for power line communication in the PLC system. The PLC signal may be transmitted on one carrier frequency, a plurality of carrier frequencies or on all carrier frequencies assigned to the transmission band. A receiving device measures a received signal in the case that a transmitting PLC modem device transmits such a PLC signal and measures the noise in a time period when the transmitting PLC modem device does not transmit such a PLC signal. If the receiving device monitors an increased noise for individual receiving frequencies, the presence of an impedance modulating device is detected. Transmitting frequencies affected by frequency intermodulations and causing inter-carrier-interference monitored at the individual receiving frequency may be determined by calculation performed, for instance, by the receiving device. The determined transmitting frequencies may be selected to be notched from power line communication within the PLC system.

Furthermore, the PLC signal may be transmitted over a predetermined time period larger than the line cycle of the mains used by the PLC system. The receiving device may record the timings when the signal-to-noise ratio for individual frequencies of the PLC signal changes. Since these timings correspond to the timings when the impedance modulating device switches and since the timings of next switching events are predictable, time periods may be selected to be avoided for transmitting PLC signals may be selected.

The received PLC signal may be received and measured by devices as described above.

According to a further embodiment of the inventive method, interferences caused by an impedance modulating device may be detected by determining a maximum value and a minimum value of a communication function of the PLC system for a specific transmission frequency, while the transmission frequency is swept over the frequency range used for power line communication and by determining a difference between the maximum value and the minimum value for each transmission frequency. Interference is determined as present at a specific transmission frequency, if the difference for this specific transmission frequency is larger than a predetermined value. The predetermined value can be predefined by a user or may be determined by a device, for instance a network or spectrum analyzer or one of the PLC modem devices of the PLC system. In predefining or determining the predetermined value different parameters of the PLC system and of other services may be considered. By way of example, a desired level of protection of other services, for instance amateur radio, from interferences caused by power line communication or a desired data transfer capacity within the PLC system can be considered and balanced by defining the predetermined value.

The measured communication function of the PLC system may be selected from the group of attenuation, signal-to-noise ratio or error-rate of a transmission signal, channel capacity or noise. It may be measured by a network or spectrum analyzer connected to a test channel between two PLC modem devices of the PLC system or by a PLC modem device of the PLC system, even by the PLC modem device transmitting a signal itself.

Figure 5:
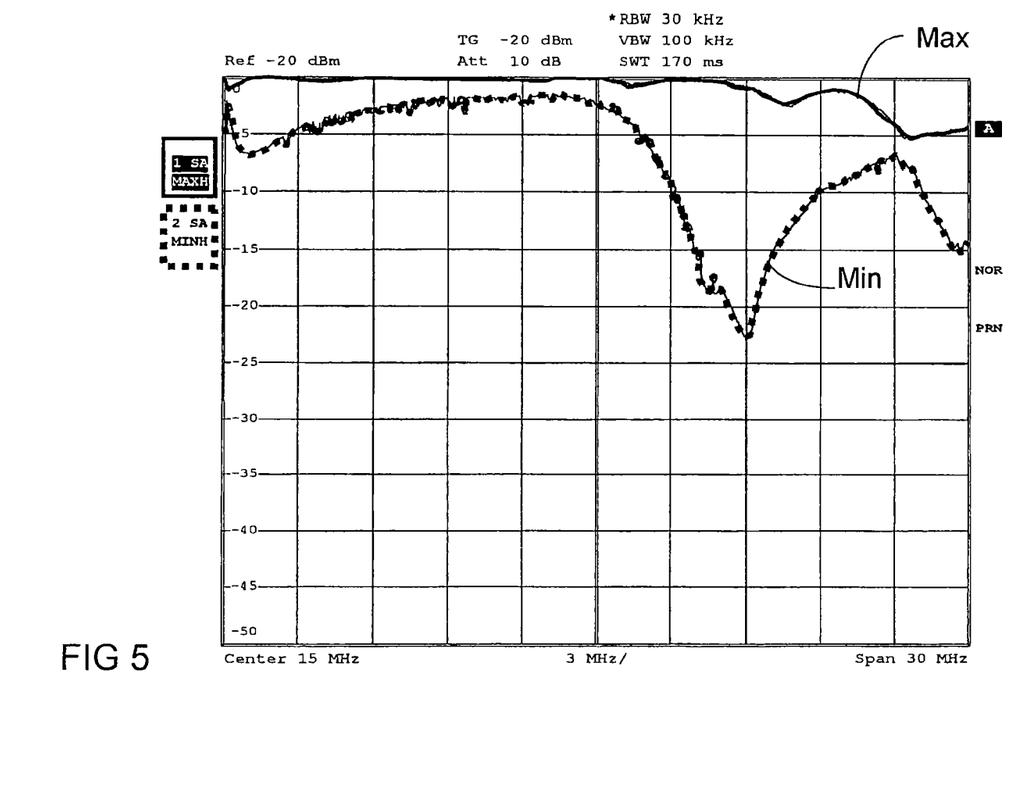
FIG. 5 shows an exemplary communication function of a PLC system, wherein the transmission frequency is swept.

FIG. 5 shows an exemplary communication function of the PLC system measured over all transmission frequencies. The exemplary communication function is the attenuation of a transmission signal and is represented by the y-axis using a scale of 5 dB per division. The x-axis represents the transmission frequency changing from 0 MHz to 30 MHz and is scaled by 3 MHz per division. The Max-line (non-dotted) represents the measured maximum values for each frequency, wherein the Min-line (dotted) represents the measured minimum values for each frequency. As can be seen, the difference between the maximum value and the minimum value for frequencies smaller than 18 MHz or larger than 24 MHz and smaller than 28 MHz is only small, whereas the difference is large for frequencies between 18 MHz and 24 MHz, with the largest difference of more than 20 dB at 21 MHz. If a PLC receiver of a network analyzer monitors such a behavior on the channel, the existence of an impedance modulating device is detected. Which transmission frequencies are eventually selected to be notched from power line communication may be determined in dependence on the considerations described above.

According to another embodiment of the invention, interferences caused by an impedance modulating device may be detected by measuring a communication function of the PLC system for a specific transmission frequency, while the transmission frequency is swept over the frequency range used for power line communication. The communication function is measured over a predetermined time period larger than the line cycle of the mains used by the PLC system. An interference is determined as present at a specific transmission frequency, if the communication function changes periodically for this specific transmission frequency within the line cycle period of the alternating current of the mains.

The measured communication function of the PLC system may be selected as described above and measured by devices as described above.

Figure 6:
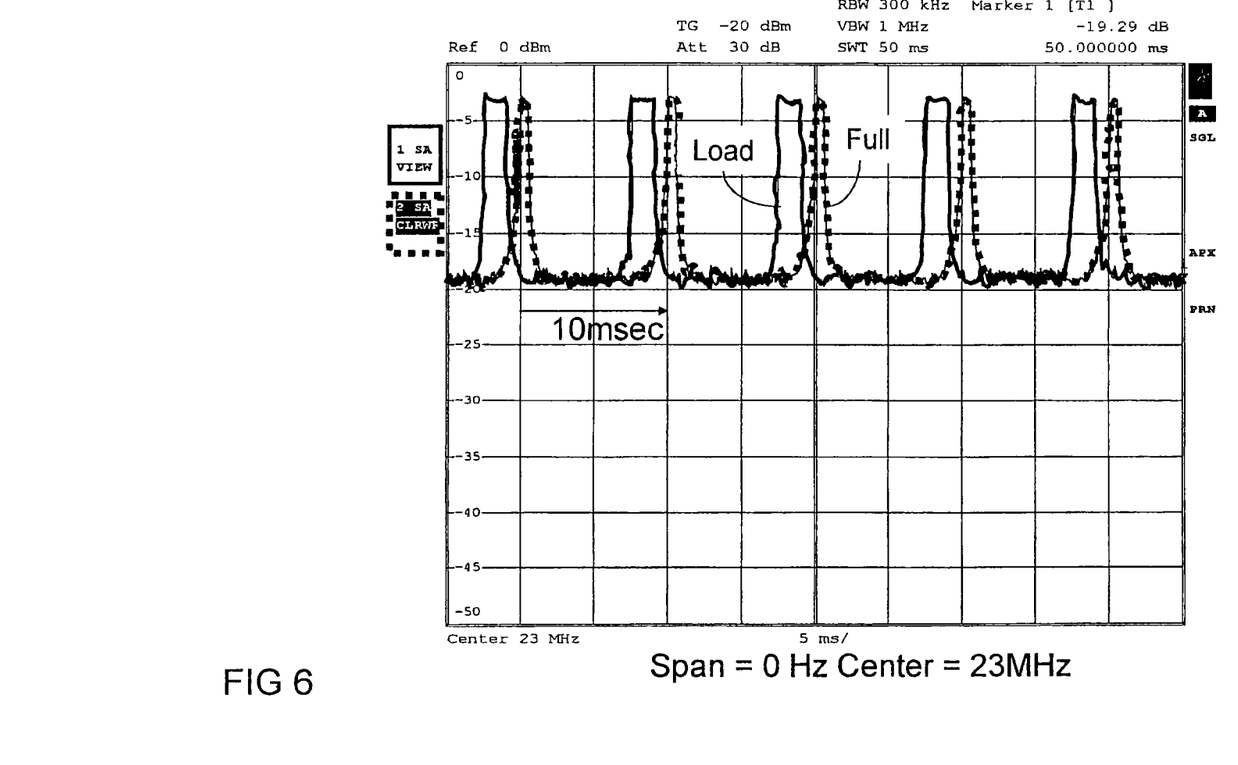
FIG. 6 shows an exemplary communication function of a PLC system for a transmission frequency interfered by an Impedance modulating device over a predetermined time period.

FIG. 6 shows an exemplary communication function of the PLC system for a transmission frequency influenced by an impedance modulating device measured over a predetermined time period. The exemplary communication function is the attenuation of a transmission signal with frequency of 23 MHz and is represented by the y-axis using a scale of 5 dB per division. The x-axis represents the measuring time changing from 0 to 50 ms and is scaled by 5 ms per division. The Load-line (non-dotted) represents the measured attenuation for a high load connected to a secondary side of the impedance modulating device, for instance a mobile phone with the batteries in charging mode. The Full-line (dotted) represents the measured attenuation for a low load connected to the secondary side of the impedance modulating device, for instance the mobile phone with the batteries fully charged. As can be seen, the communication function changes synchronous with the 50 Hz line cycle. The timings when the switching of the rectifier diodes of the impedance modulating device occurs might be recorded. The timings of next switching events are predictable. Therefore, transmission of PLC signals may be avoided during switching time periods.

It is to be noted that the measured communication function as described with respect to FIGS. 5 and 6 depends on the configuration of the PLC system as well as on the used channel, the length of the wires used for measurement and on the characteristics of the impedance modulating device.

Since the configuration of the PLC system and the presence or absence of an impedance modulating device and/or the characteristics of it may change over time, it would be favorable to perform detecting interferences repeatedly and to select frequencies to be notched and/or time periods to be avoided for transmission according to the detected interferences also repeatedly.

Figure 7:
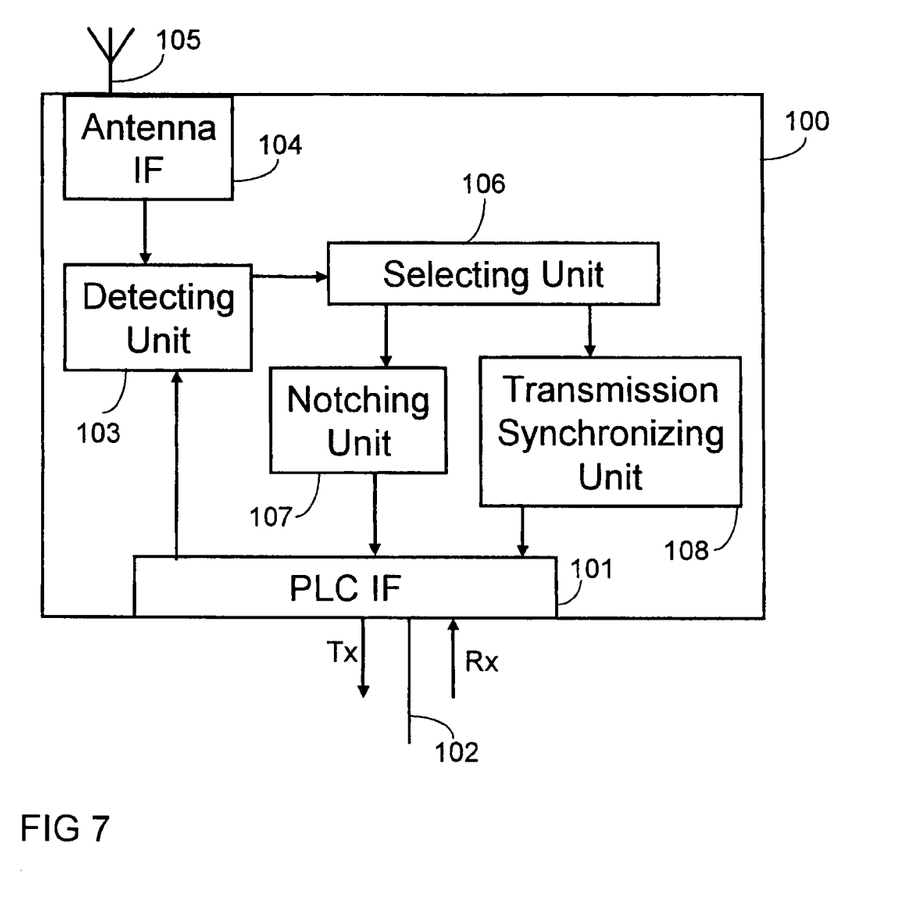
FIG. 7 shows a schematic block diagram of a PLC modem device according to an embodiment of the invention.

FIG. 7 shows a schematic block diagram of an embodiment of a PLC modem device according to the invention. A PLC modem device 100 configured to be used in the method for operating a PLC system as described above comprises a PLC interface 101 for transmitting signals to other PLC modem devices in the PLC system and for receiving signals from other PLC modem devices in the PLC system. A received signal Rx and a transmitted signal Tx are transmitted over a PLC channel 102. The PLC modem device 100 further comprises a detecting unit 103 for detecting interferences on transmission signals of the PLC system and/or on a transmission spectrum of the PLC system, wherein the interferences are caused by influences of an impedance modulating device connected to a mains used by the PLC system for communication. The detecting unit 103 may receive a signal for evaluating whether interferences of an impedance modulating device are present or not from the PLC interface 101 or from an antenna interface 104 connected to an antenna 105. Thus, the PLC modem device may receive the signal to be evaluated wireless or over a wire.

The detecting unit 103 may be configured to monitor a signal transmitted by a transmitting PLC modem device of the PLC system at a specific transmission frequency, wherein the signal is monitored at frequencies not being included in a frequency range used for power line communication within the PLC system. The detecting unit 103 is configured to label the specific transmission frequency as interfered by the impedance modulating device, if the signal is larger than the noise without transmission of signals over the PLC system.

According to a further embodiment, the detecting unit 103 may be configured to monitor a signal transmitted by a transmitting PLC modem device of the PLC system, wherein the transmitted signal comprises carrier frequencies assigned to the transmission band for power line communication in the PLC system and wherein the detecting unit 103 is configured to measure the noise for each received frequency, when the signal is transmitted and in a time period when the signal is not transmitted. The detecting unit 103 is configured to determine a specific transmission frequency corresponding to a specific receiving frequency for which the noise is increased when the signal is transmitted and to label the specific transmission frequency as interfered by the impedance modulating device. The transmitted signal may comprise some or all carrier frequencies assigned to the transmission band.

According to another embodiment, the detecting unit 103 may be configured to determine a maximum value and a minimum value of a communication function of the PLC system for a specific transmission frequency, to determine a difference between the maximum value and the minimum value, and to label the specific transmission frequency as interfered by the impedance modulating device, if the difference for the specific transmission frequency is larger than a predetermined value.

According to yet a further embodiment, the detecting unit 103 may be configured to measure a communication function of the PLC system for a specific transmission frequency over a predetermined time period larger than the line cycle of the mains used by the PLC system and to label the specific transmission frequency as interfered by the impedance modulating device, if the communication function changes periodically within the predetermined time period.

The transmitting PLC modem device and the PLC modem device 100 comprising the detecting unit 103 may be the same PLC modem device.

The PLC modem device 100 according to the invention further comprises a selecting unit 106 for selecting frequencies on which the impedance modulating device causes interferences and which are to be notched from powerline communication and/or for selecting time periods in which the impedance modulating device is in a switching mode and which are to be avoided for transmitting PLC signals. The selecting unit 106 may further be configured to generate a transmission signal Tx for providing other PLC modem devices of the PLC system with data describing the selected frequencies and/or the selected time periods. However, other possibilities for providing these data to the other PLC modem devices of the PLC system may be possible, as for instance reading out of the data by a user or an administrator of the PLC system and supplying the data to other PLC modem devices via user interfaces being part of the individual other PLC modem devices.

According to an embodiment, the PLC modem device 100 may further comprise at least one of a notching unit 107 for notching frequencies selected by the selecting unit 106 from transmission using power line communication or a transmission synchronizing unit 108 for avoiding transmission of PLC signals in time periods selected by the selecting unit 106.

The inventive method and the inventive PLC modem device may be used with different operating schemes of a PLC system, like MIMO (Multiple Input—Multiple Output), OFDM (Orthogonal Frequency Division Multiplex), Wavelet transmissions, etc.

It is apparent that the PLC modem device 100 may comprise further components, e.g. a microprocessor, a display, a memory unit or others, which are not shown in FIG. 7.

Figure 8:
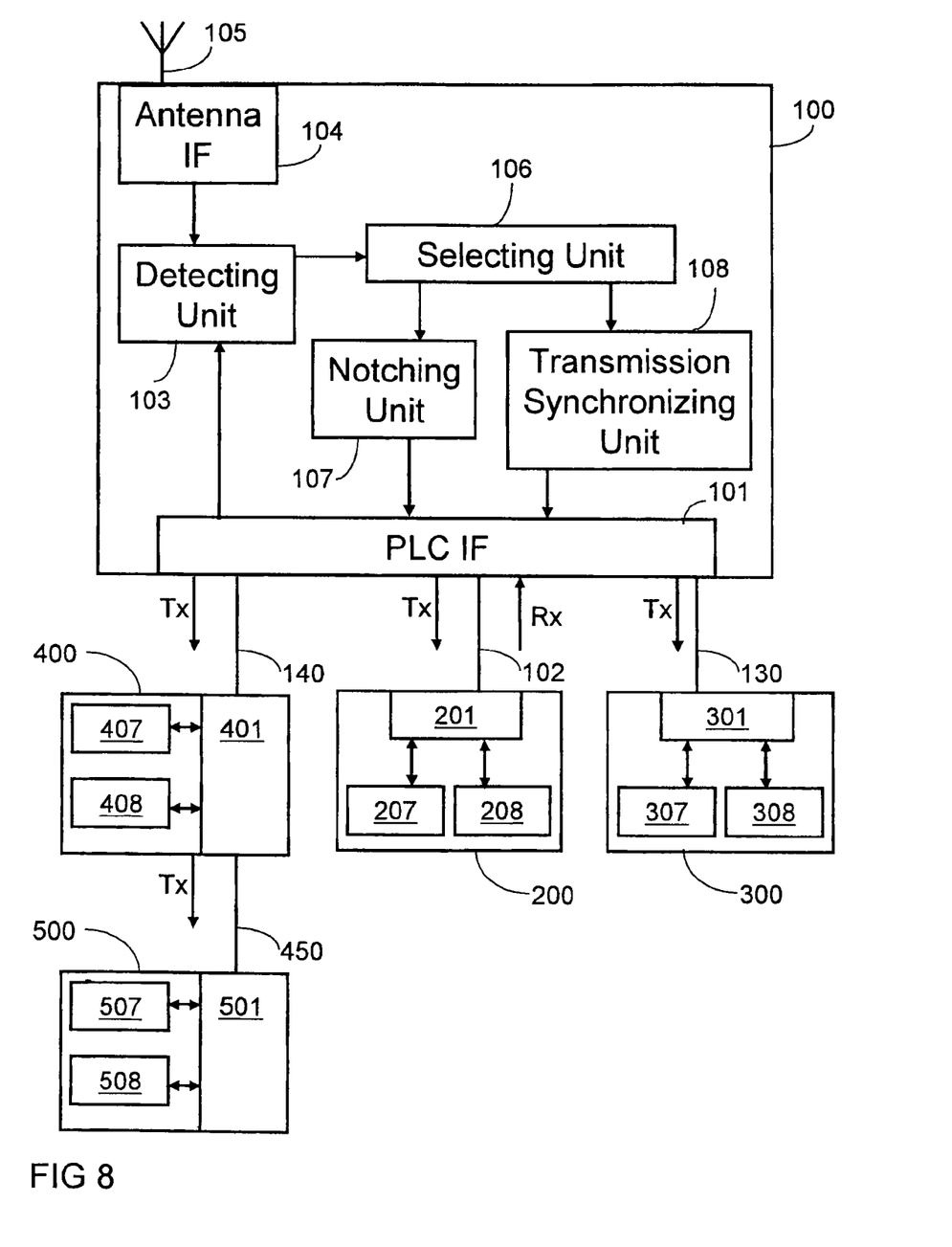
FIG. 8 shows a schematic block diagram of a PLC system according to an embodiment of the invention.

FIG. 8 shows a schematic block diagram of an embodiment of a PLC system according to the invention. The PLC system comprises a first PLC modem device and at least one second PLC modem device. At least the first or the second PLC modem device is a PLC modem device according to the invention comprising a detecting unit and a selecting unit. The first and the second PLC modem devices each comprise a PLC interface for transmitting signals to other PLC modem devices in the PLC system and for receiving signals from other PLC modem devices in the PLC system.

In the embodiment of FIG. 8, the first PLC modem device 100 is a PLC modem device according to the invention comprising a first PLC interface 101, a detecting unit 103 and a selecting unit 106. The first PLC modem device 100 may comprise further components as described with respect to FIG. 7. A second PLC modem device 200 connected to the first PLC modem device 100 by a PLC channel 102 comprises a second PLC interface 201 and may comprise further components as described in detail later.

The second PLC modem device 200 may transmit a signal over the PLC channel 102, whereas the first PLC modem device 100 detects interferences on the transmission signal and/or on the transmission spectrum of the PLC system as described above. The first PLC modem device 100 selects frequencies to be notched from power line communication and/or time periods to be avoided for transmitting PLC signals as described above. The selected frequencies and/or time periods are then provided to the second PLC modem device 200, for instance using a transmission signal Tx.

The PLC system may comprise further PLC modem devices 300, 400 and 500. The PLC modem devices 300 and 400 may communicate directly with the first PLC modem device 100 over PLC channels 130 and 140, respectively, whereas the PLC modem device 500 may communicate directly only with the PLC modem device 400 over PLC channel 450. Each of the PLC modem devices 300, 400 and 500 comprises a PLC interface 301, 401 or 501, respectively, configured to at least receive signals from other PLC modem devices in the PLC system.

According to an embodiment, the first or the second PLC modem device comprising the detecting unit and the selecting unit is configured to transmit the selected frequencies and/or the selected time periods to all other PLC modem devices in the PLC system. Further, all of the other PLC modem devices in the PLC system, which are configured to transmit signals to other PLC modem devices in the PLC system, comprise at least one of a notching unit for notching frequencies selected by the selecting unit from transmission or a transmission synchronizing unit for avoiding transmission of PLC signals in time periods selected by the selecting unit.

With respect to FIG. 8, all depicted PLC modem devices 200, 300, 400 and 500 are configured to transmit signals to other PLC modem devices in the PLC system. They comprise notching units 207, 307, 407 or 507, respectively, and/or transmission synchronizing units 208, 308, 408 or 508, respectively, in order to adapt transmission of signals to the selected frequencies and/or time periods provided by the first PLC modem device 100 as described above. If a PLC modem device is not configured to transmit signals to other PLC modem devices, it is not necessary for this PLC modem device to comprise a notching unit and/or a transmission synchronizing unit.

The method, the PLC modem device and the PLC system according to the invention may effectively reduce interferences to the power line communication in the PLC system itself and to radio services or other PLC systems by notching frequencies influenced by an impedance modulating device and causing inter-carrier interferences and/or by avoiding transmission of PLC signals in time periods when an impedance modulating device is in a switching mode.

The invention claimed is:

1. A method for operating a Power Line Communication (PLC) system including at least one PLC modem device, the method comprising:
    detecting interferences on transmission signals of the PLC system and/or on a transmission spectrum of the PLC system, the interferences being caused by influences of an impedance modulating device outside the PLC system, but connected to a mains used by the PLC system for communication, switching, in a switching mode;

when any such interferences are detected, selecting time periods in which the impedance modulating device is in the switching mode to be avoided for transmitting PLC signals; and transmitting the selected time periods in which the impedance modulating device is in the switching mode to be avoided for transmitting PLC signals to a plurality of PLC modem devices of the PLC system.

2. The method according to claim 1, wherein said detecting interferences includes monitoring a signal transmitted by a transmitting PLC modem device of the PLC system and received by a receiving device.

3. The method according to claim 2, wherein the signal is monitored at frequencies not included in a frequency range used for power line communication within the PLC system, while sweeping a transmission frequency over the frequency range used for power line communication.

4. The method according to claim 2,
wherein the signal transmitted by the transmitting PLC modem device comprises carrier frequencies assigned to a transmission band for power line communication in the PLC system,
wherein the receiving device measures noise for each frequency when the signal is transmitted and noise in a time period when the signal is not transmitted, and
wherein an interference from the impedance modulating device is determined as present at a specific transmission frequency when the measured noise at a specific receiving frequency corresponding to the specific transmission frequency is increased when the signal is transmitted.

5. The method according to claim 2, wherein the receiving device receives the signal wirelessly or over a wire.

6. The method according to claim 1, wherein said detecting interferences includes:
determining a maximum value and a minimum value of a communication function of the PLC system for a specific transmission frequency, while sweeping the transmission frequency over a frequency range used for power line communication; and
determining a difference between the maximum value and the minimum value,
wherein an interference from the impedance modulating device is determined as present at the specific transmission frequency, when the difference between the maximum value and the minimum value for the specific transmission frequency is larger than a predetermined value.

7. The method according to claim 6, wherein the communication function is selected from the group of attenuation, signal-to-noise ratio or error-rate of a transmission signal, channel capacity, or noise.

8. The method according to claim 6, wherein the communication function is measured by a network or spectrum analyzer connected to a test channel between two PLC modem devices of the PLC system or by a PLC modem device of the PLC system.

9. The method according to claim 1,
wherein said detecting interferences includes measuring a communication function of the PLC system for a specific transmission frequency, while sweeping the transmission frequency over a frequency range used for power line communication, over a predetermined time period larger than a line cycle of the mains used by the PLC system, and wherein an interference from the impedance modulating device is determined as present at the specific transmission frequency, when the communication function changes periodically within the predetermined time period.

10. The method according to claim 1, wherein said detecting interferences is performed repeatedly.

11. The method according to claim 1,
wherein said detecting interferences includes:
measuring a communication function of the PLC system for a specific transmission frequency over a predetermined period of time greater than the line cycle of the mains used by the PLC system, and
labeling the specific transmission frequency as interfered by the impedance modulating device when the communication function changes periodically within the predetermined time period.

12. A Power Line Communication (PLC) modem device comprising:
a PLC interface that transmits signals to other PLC modem devices in a PLC system and that receives signals from the other PLC modem devices in the PLC system;
detection circuitry that detects interferences on transmission signals of the PLC system and/or on a transmission spectrum of the PLC system, the interferences being caused by influences of an impedance modulating device outside the PLC system, but connected to a mains used by the PLC system for communication, switching, in a switching mode; and
selection circuitry that selects time periods in which the impedance modulating device is in the switching mode and which are to be avoided for transmitting PLC signals,
and that causes transmission of the selected time periods in which the impedance modulating device is in the switching mode to the other PLC modem devices in the PLC system.

13. The PLC modem device according to claim 12, wherein the detection circuitry monitors a signal transmitted by a transmitting PLC modem device of the PLC system and labels a specific transmission frequency as interfered by the impedance modulating device, when the signal is larger than a noise without transmission of signals over the PLC system.

14. The PLC modem device according to claim 13,
wherein the signal is transmitted at the specific transmission frequency, and
wherein the detection circuitry monitors the signal at receiving frequencies not included in a transmission frequency band of the PLC system.

15. The PLC modem device according to claim 13,
wherein the transmitted signal comprises carrier frequencies assigned to the transmission band for power line communication in the PLC system, and
wherein the detection circuitry measures noise for each received frequency when the signal is transmitted and in a time period when the signal is not transmitted and determines the specific transmission frequency corresponding to the specific receiving frequency for which the noise is increased when the signal is transmitted.

16. The PLC modem device according to claim 13, wherein the PLC modem device is configured to receive the signal wirelessly or over a wire.

17. The PLC modem device according to claim 12, wherein the detection circuitry determines a maximum value and a minimum value of a communication function of the PLC system for a specific transmission frequency, determines a difference between the maximum value and the minimum value, and labels the specific transmission frequency as interfered by the impedance modulating device, when the difference between the maximum value and the minimum value for the specific transmission frequency is larger than a predetermined value.

18. The PLC modem device according to claim 12, wherein the detection circuitry measures a communication function of the PLC system for a specific transmission frequency over a predetermined time period larger than a line cycle of the mains used by the PLC system, and labels the specific transmission frequency as interfered by the impedance modulating device, when the communication function changes periodically within the predetermined time period.

19. The PLC modem device according to claim 12, further comprising notching circuitry that notches frequencies selected by the selection circuitry from transmission using power line communication and transmission synchronizing circuitry that avoids transmission of the PLC signals in the time periods selected by the selection circuitry.

20. A Power Line Communication (PLC) system comprising:
  a first PLC modem device and at least one second PLC modem device,
  wherein at least the first or the second PLC modem device includes:
    a first PLC interface to transmit signals to the other one of the first or the second PLC modem device in the PLC system and to receive signals from the other one of the first or the second PLC modem device in the PLC system,
    detection circuitry to detect interferences to transmission signals of the PLC system and/or to a transmission spectrum of the PLC system, the interferences being caused by influences of an impedance modulating device outside the PLC system, but connected to a mains used by the PLC system for communication, switching, in a switching mode, and
    selection circuitry to select time periods in which the impedance modulating device is in the switching mode and which are to be avoided for transmitting PLC signals, and
    to cause transmission of the selected time periods in which the impedance modulating device is in the switching mode to all other PLC modem devices in the PLC system, including the other of the first or the second PLC modem device,
  wherein the other one of the first or the second PLC modem device includes at least a second PLC interface to transmit signals to other PLC modem devices in the PLC system and to receive signals from the other PLC modem devices in the PLC system.

21. The power line communication system according to claim 20,
  wherein all of said PLC modem devices in the PLC system are configured to transmit signals to other PLC modem devices in the PLC system and include notching circuitry to notch frequencies selected by the selection circuitry from transmission and transmission synchronizing circuitry to avoid transmissions of PLC signals in the time periods selected by the selection circuitry.

\* \* \* \* \*